United States Patent
Kaneko et al.

(10) Patent No.: US 8,848,244 B2
(45) Date of Patent: Sep. 30, 2014

(54) IMAGE INSPECTION METHOD, APPARATUS, CONTROL PROGRAM OVERLAPPING INSPECTION IMAGES TO OBTAIN POSITIONAL SHIFT

(71) Applicants: Hitomi Kaneko, Saitama (JP); Tadashi Kitai, Kanagawa (JP); Hiroyoshi Ishizaki, Kanagawa (JP); Keiji Kojima, Kanagawa (JP); Hiroyuki Kawamoto, Kanagawa (JP); Keiichi Miyamoto, Kanagawa (JP)

(72) Inventors: Hitomi Kaneko, Saitama (JP); Tadashi Kitai, Kanagawa (JP); Hiroyoshi Ishizaki, Kanagawa (JP); Keiji Kojima, Kanagawa (JP); Hiroyuki Kawamoto, Kanagawa (JP); Keiichi Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/790,316

(22) Filed: Mar. 8, 2013

(65) Prior Publication Data

US 2013/0250319 A1 Sep. 26, 2013

(30) Foreign Application Priority Data

Mar. 22, 2012 (JP) ................. 2012-065466

(51) Int. Cl.
*G06K 15/12* (2006.01)
*H04N 1/387* (2006.01)
*G06K 9/03* (2006.01)
*G06T 7/00* (2006.01)

(52) U.S. Cl.
CPC .......... *G06K 9/03* (2013.01); *G06T 2207/30144* (2013.01); *G06T 7/001* (2013.01)
USPC .......................... 358/1.9; 358/1.18; 358/406

(58) Field of Classification Search
None
See application file for complete search history.

(56) References Cited

U.S. PATENT DOCUMENTS

| | | | | |
|---|---|---|---|---|
| 7,684,625 | B2 * | 3/2010 | Hyoki | 358/3.26 |
| 2013/0044342 | A1 * | 2/2013 | Kaneko et al. | 358/1.13 |
| 2013/0044347 | A1 * | 2/2013 | Kitai et al. | 358/1.14 |
| 2013/0148863 | A1 * | 6/2013 | Muraishi | 382/112 |
| 2013/0250369 | A1 * | 9/2013 | Kitai et al. | 358/405 |
| 2013/0250370 | A1 * | 9/2013 | Kojima et al. | 358/405 |
| 2014/0036290 | A1 * | 2/2014 | Miyagawa et al. | 358/1.13 |

FOREIGN PATENT DOCUMENTS

| | | |
|---|---|---|
| JP | 11-078183 | 3/1999 |
| JP | 2005-049212 | 2/2005 |

* cited by examiner

*Primary Examiner* — Scott A Rogers
(74) *Attorney, Agent, or Firm* — Cooper & Dunham LLP

(57) ABSTRACT

An image inspection apparatus obtains a threshold value indicating an allowable range of offset differences between an output target inspection image and a pre-provided inspection image, and determines whether to inspect a read image obtained by reading an output target image formed on a recording sheet having a pre-provided image, using the threshold value.

16 Claims, 14 Drawing Sheets

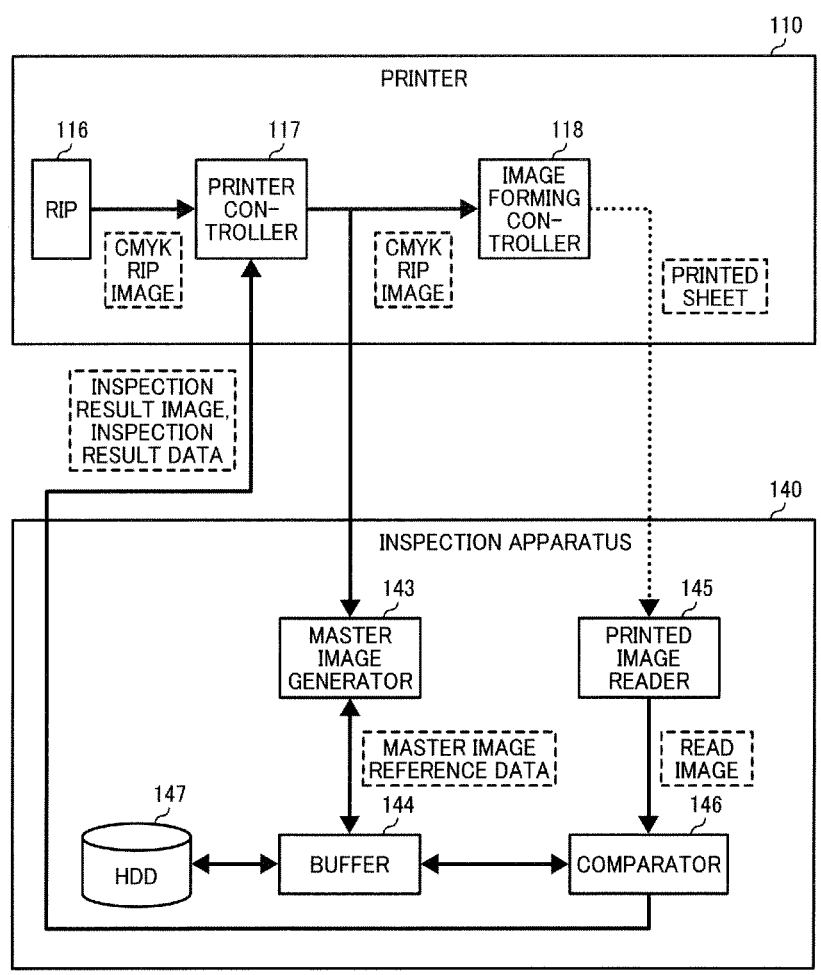

FIG. 10A

| 0 | -1/4 | 0 |
|---|---|---|
| -1/4 | 1 | -1/4 |
| 0 | -1/4 | 0 |

FIG. 10B

| 1 | 0 | -1 |
|---|---|---|
| 1 | 0 | -1 |
| 1 | 0 | -1 |

FIG. 10C

| 1 | 1 | 1 |
|---|---|---|
| 0 | 0 | 0 |
| -1 | -1 | -1 |

IMAGE INSPECTION METHOD, APPARATUS, CONTROL PROGRAM OVERLAPPING INSPECTION IMAGES TO OBTAIN POSITIONAL SHIFT

CROSS-REFERENCE TO RELATED APPLICATIONS

This patent application is based on and claims priority pursuant to 35 U.S.C. §119 to Japanese Patent Application No. 2012-065466, filed on Mar. 22, 2012, in the Japan Patent Office, the entire disclosure of which is hereby incorporated by reference herein.

BACKGROUND

1. Field of the Invention

The present invention relates to an image inspection method, an image inspection apparatus, and a recording medium storing an image inspection control program, and more particularly to a method and an apparatus of inspecting a printed image.

2. Description of the Related Art

Conventionally, inspection of printed matter printed out by a printing apparatus is performed by human operators. In recent years, an inspection apparatus that automatically inspects printed matter has been used. In such an inspection apparatus, a master image serving as a reference image is generated by reading a base document prepared in advance, and corresponding portions of the master image and a read image of printed matter are compared to determine, by the degree of the difference therebetween, whether there is a defect in the printed matter.

The inspection target of the inspection apparatus is not limited to printed matter where the same content is printed each time. For instance, the inspection target may be a large number of printed documents that respectively have different contents, such as a large number of statements or bills printed for numerous customers. For a method of printing different contents on template documents, e.g., such as statements or bills, a sheet on which a template portion is printed in advance (hereinafter, referred to as a preprint sheet) is prepared. To the preprint sheet, specific information (hereinafter, referred to as a variable image) unique to each individual document, such as the address and amount of the bill, is individually printed. This printing method is referred to as the preprint printing.

In order to inspect the printed matter which is preprint-printed, a master image is generated for each specific document and corresponding portions of the master image and an inspection image are compared to determine, by the degree of the difference therebetween, whether there is a defect in the printed matter. However, in such a method, since the master image does not include information on a content (preprint image) printed on the preprint sheet, the inspection apparatus detects such content (preprint image) as the difference between the inspection image and the master image such that an accurate result is not obtained.

In view of this, Japanese Patent Application Publication No. H11-78183-A describes an inspection method, in which a preprint image layer of an inspection image is masked to generate the inspection image having only a variable image, and the inspection image is compared with a master image to inspect a defect.

Japanese Patent Application Publication No. 2005-49212-A describes an inspection method, in which change in magnification and change in print position are calculated for each of a preprint image layer and a variable image layer of an inspection image, and when the calculation result exceeds a threshold, it is determined that a print result is defective.

SUMMARY

The preprint sheet may be created by printing a preprint image on a white sheet. While printing, the fluctuations in magnification or print position may occur in a print result of the preprint image. Further, when printing a variable image on the preprint sheet, magnification or print position in the variable image may be changed If there is change in magnification or print position in the preprint image or the variable image, a preprint image layer of an inspection image cannot be entirely masked using the inspection method described in Japanese Patent Application Publication No. H11-78183-A, thus affecting determination as to whether a print result is good or not.

While the above-described problem may be solved using the inspection method described in Japanese Patent Application Publication No. 2005-49212-A, overlap between the preprint image and the variable image may occur depending on the degree of change in magnification or print position. In such case, it may not be determined to be defective.

To solve the above-described problem and other problems, an object of an embodiment of the present invention is to provide an inspection apparatus capable of obtaining an inspection result based on comparison between a printed image printed by preprint printing and a master image, with a simple configuration and improved accuracy.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a block diagram illustrating a functional configuration of the printing apparatus according to an example embodiment of the present invention;

FIGS. 10A to 10C are illustration for explaining image processing filters that are used to extract reference points;

Figure 1:
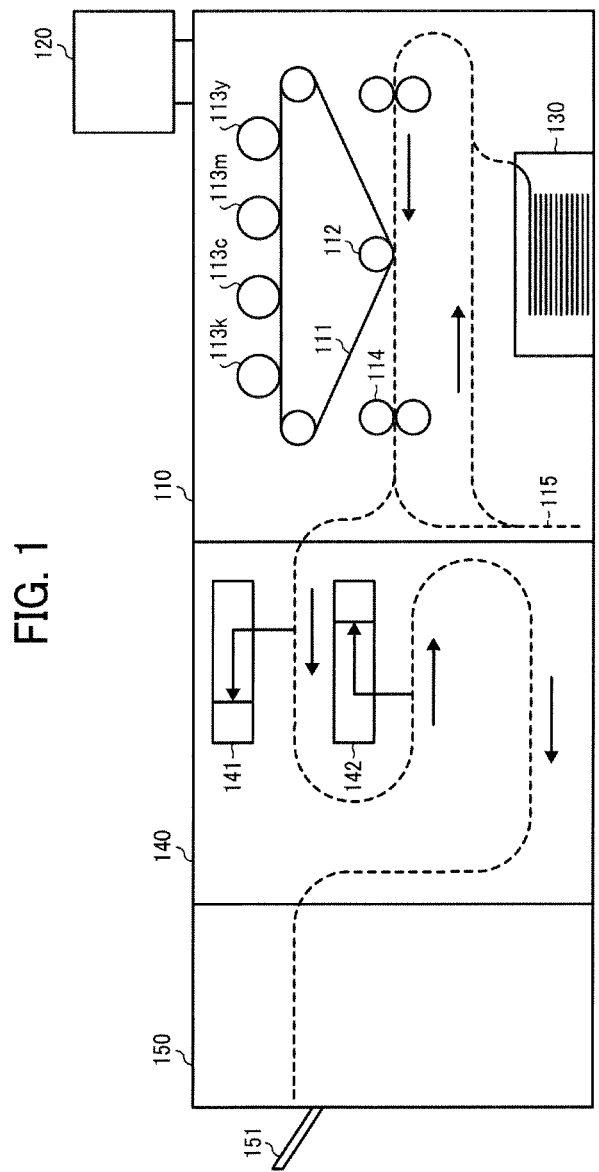
FIG. 1 is a diagram illustrating a configuration of a printing apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 is a schematic diagram illustrating a configuration of a printing apparatus according to an example embodiment of the present invention. As illustrated in FIG. 1, the printing apparatus mainly includes a printer 110, an operating unit 120, an inspection apparatus 140, and a stacker 150. In the following examples referring to the drawings, a printing apparatus of FIG. 1, which is one example of the printing apparatus, includes the inspection apparatus 140 that inspects print quality of a printed image. The printing apparatus outputs a printed image, which is generated by the printer 110 based on image data according to a print job. The inspection apparatus 140 generates a master image M, and compares the printed image with the master image M. More specifically, in the following examples, it is assumed that the print image is generated by preprint printing. As used herein, the preprint printing refers to a printing method in which specific information (hereinafter, referred to as a variable image V) unique to each specific document is printed on a sheet on which an image such as borders serving as a format is previously printed (hereinafter, referred to as a preprint sheet P). The preprint sheet P may be created beforehand by offset printing, etc.

In the printer 1, an image forming device is provided, which includes a plurality of photoconductive drums 113k, 113c, 113m, and 113y, which respectively form a black image, cyan image, magenta image, and yellow image thereon. The printer 1 is further provided with an endless belt 111, which is rotated along with rotation of a plurality of rollers including a transfer roller 112. The black image, cyan image, magenta image, and yellow image that are respectively formed on the surfaces of the drums 113k, 113c, 113m, and 113y, are transferred onto the belt 111 one above the other to form a full-color toner image on the belt 111. The full-color toner image, being carried by the belt 111, is transferred from the belt 111 onto a recording sheet fed from a sheet feeder 130, at a transfer section where the transfer roller 112 is provided. The recording sheet having the toner image formed thereon is further conveyed to a fixing roller 114. The fixing roller 114, together with a pressure roller, fixes the toner image onto the recording sheet by heat and pressure.

In case of single-sided printing, the sheet having the toner image transferred and fixed thereon is directly transported to the inspection apparatus 140. In case of double-sided printing, the sheet having one side with the fixed toner image is conveyed to a switchback path 115, and transferred back to the transfer roller 104 to transfer and fix a toner image on the other side of the sheet. The recording sheet, after being fixed at the fixing roller 105, may be then conveyed to the inspection apparatus 202.

The sheet feeder 130 stores a stack of recording sheets. In this example, it is assumed that the sheet feeder 130 stores a stack of preprint sheets P such that the printer 110 prints a variable image on the preprint sheet.

The operating unit 120 functions as a user interface. In one example, the operating unit 120 functions as an output interface that visually displays the operation state of the printing apparatus, or displays an image such as a screen to request for user input. In another example, the operating unit 120 functions as an input interface such as a touch panel that allows a user to directly operate the printing apparatus, for example, to input information to the printing apparatus.

The inspection apparatus 140 includes two reading devices 141 and 142. More specifically, the inspection apparatus 140 reads, by the reading devices 141 and 142, the respective sides of the printed sheet conveyed from the printer 110. The sheet whose both sides have been read is conveyed to the stacker 150. As described below, the inspection apparatus 140 compares printed images read by the reading devices 141 and 142 (hereinafter, referred to as read images R) with corresponding master images M, and inspects the print quality of the printed images. The stacker 150 stacks the sheet conveyed from the inspection apparatus 140, in a tray 151.

Figure 2A:
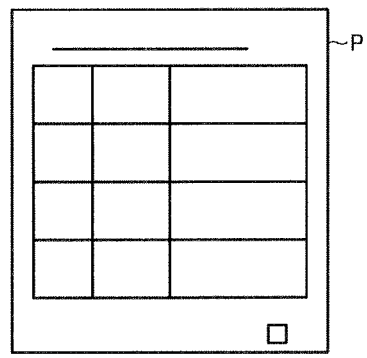
FIG. 2A is an illustration of an example preprint sheet.
Figure 2B:
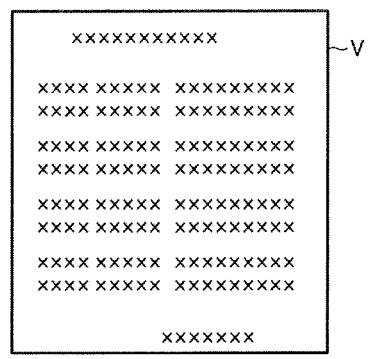
FIG. 2B is an illustration of an example variable image to be printed on the preprint sheet of FIG. 2A.
Figure 2C:
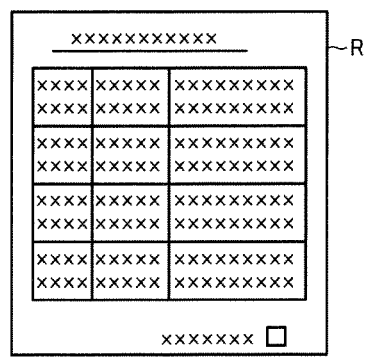
FIG. 2C is an illustration of an example printed sheet obtained by printing the variable image of FIG. 2B onto the preprint sheet of FIG. 2A.

Next, with reference to FIGS. 2A to 2C, a print image to be inspected by the inspection apparatus 140 will be described according to an example embodiment of the present invention. FIG. 2A is an illustration of an example preprint sheet P on which a template portion such as lines is previously printed. FIG. 2B is an illustration of an example variable image V to be printed by the printer 110 onto the preprint sheet P. FIG. 2C is an illustration of a printed sheet R which is a print result obtained by printing the variable image V illustrated in FIG. 2B on the preprint sheet P illustrated in FIG. 2A.

Specifically, as illustrated in FIGS. 2A to 2C, the inspection apparatus 140 in this example inspects print quality of the print result R where the variable image V is printed on the preprint sheet P. As described above, the variable image V is specific information unique to each specific document, such that it varies from document to document. Accordingly, the print result R to be inspected varies from document to document.

In this specification, the same reference numeral is assigned to the read image and the print result, based on assumption that the read image reflects the contents of the print result. However, it does not mean that the read image is identical to the print result, as it may not be technically possible to fully reflect the print result by reading using, for example, the image reading device.

Here, to inspect a print result R such as the print image illustrated in FIG. 2C, the print result R is read by the reading devices 141 and 142 to generate a read image R. The read image R is then compared with a master image M serving as a reference image. The master image is one example of an inspection image to be used for inspecting the printed image. Specifically, in the this example, two types of master images M are generated, that is, a master image for an image printed on the preprint sheet P illustrated in FIG. 2A (hereinafter, referred to as a preprint master image PM) and a master image for the variable image V illustrated in FIG. 2B (hereinafter, referred to as a variable master image VM). The preprint master image is one example of a pre-provided master image, which reflects a pre-provided image that is previously provided on a recording sheet. The variable master image is one example of an output target master image, which reflects an output target image to be formed on the recording sheet having the pre-provided image thereon.

The inspection apparatus 140 inspects the print quality of the print result R using the preprint master image PM and the variable master image VM. The preprint master image PM is the same for all pages, and is previously registered in a memory of the inspection apparatus 140. The variable master image VM varies from page to page and is generated for each document.

Figure 4:
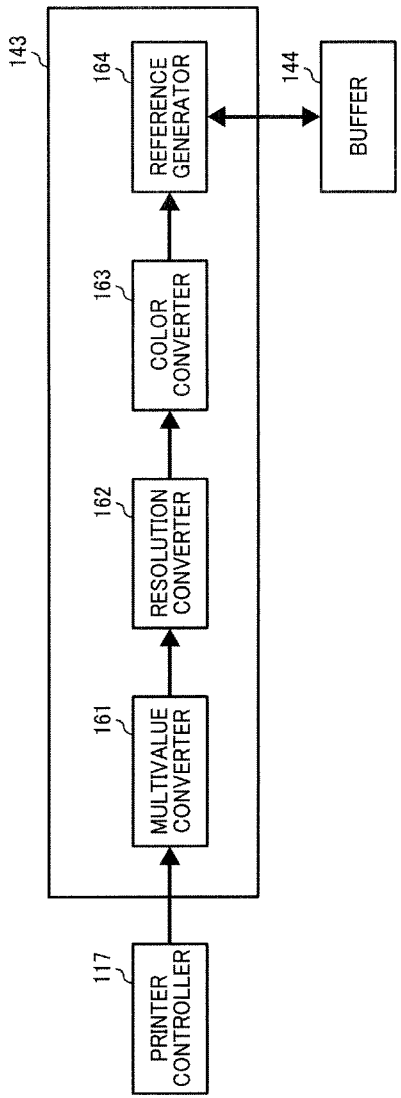
FIG. 4 is a block diagram illustrating a functional configuration of the printing apparatus according to an example embodiment of the present invention.

Next, operation of generating a variable master image VM is described with reference to FIGS. 3 and 4, according to an example embodiment of the present invention. FIGS. 3 and 4 are schematic block diagrams illustrating a functional configuration of the printing apparatus according to the example embodiment. Upon generating a variable master image VM, the printing apparatus is set to a normal print mode. The printing apparatus receives, at a raster image processor (RIP) 116, a PDL (Page Description Language) such as PostScript and an image such as an image in TIFF (Tagged Image File Format), from an external storage medium or an external source through a network. The printing apparatus generates a RIP image of CMYK (Cyan Magenta Yellow Black) key plates. The generated RIP image, which is referred to as the CMYK RIP image or simply the RIP image, is transferred, to a printer controller 117. The print controller 117 further sends the RIP image to an image forming controller 118 and the inspection apparatus 140.

When the RIP image is inputted to the inspection apparatus 140, a master image generator 143 receives the RIP image. As illustrated in FIG. 4, the master image generator 143 includes a multivalue converter 161, a resolution converter 162, a color converter 163, and a reference generator 164. The multivalue converter 161 obtains a small-value image, e.g., a binary image, from the printer controller 117 and converts the image to a multivalued bit and thereby converts the image to a multivalued image. The resolution converter 162 converts the resolution of the multivalued image and generates, for example, a halftone image. The color converter 163 converts the color of the halftone image whose resolution has been converted. As a result, a variable master image VM converted to the same format as a read image R is generated.

When the variable master image VM is generated as described above, the reference generator 164 extracts, as reference points, the coordinates of characteristic points included in the variable master image VM. The characteristic point may be extracted, for example, using a method of detecting, as a characteristic point, an edge portion of an image whose pixel value suddenly changes. Alternatively, a specific image such as a print marker arranged in a specific position in a margin portion, e.g., outside the printed portions, may be extracted by pattern matching and used as a reference point. In this example, a plurality of reference points are extracted for image size matching. After extracting the coordinates of the reference points, the master image generator 143 stores a set of the variable master image VM and the coordinates of the reference points in a buffer 144, as variable master image data.

Next, operation of generating a preprint master image PM is described with reference to FIGS. 3 and 4, according to an example embodiment of the present invention. Upon generating a preprint master image PM, the printing apparatus is set to a preprint image registration mode. The printing apparatus reads, using a printed image reader 145, a preprint sheet P sent from the printer 110 to the inspection apparatus 140, and transmits the read image to the master image generator 143 through a comparator 146 and the buffer 144. In this example, the printed image reader 145 may be implemented by the reading device 141 or 142. The comparator 146 may be implemented by a hardware such as a processing circuit, or a combination of hardware and software such as a processor that executes control programs.

The master image generator 143 generates, based on the transmitted image, a preprint master image PM of the same resolution and the same size as the read image R. As in the case of the variable master image VM, the master image generator 143 extracts, by the reference generator 164, the coordinates of characteristic points included in the preprint master image PM, as reference points. After extracting the coordinates of the reference points, the master image generator 143 stores a set of the preprint master image PM and the coordinates of the reference points in an HDD (Hard Disc Drive) 147 through the buffer 144, as preprint master image data. Note that the configuration may be such that the preprint master image data is obtained from an external storage medium or a source external to the printing apparatus through a network, in addition to the manner described above.

In the printing apparatus as described above, an area where the printed portions of a preprint master image PM do not overlap the printed portions of a variable master image VM is set in advance. With this information, the overlap between the printed portions of a preprint image and the printed portions of a variable image V can be detected in an inspection image. Accordingly, the print quality of a print result R can be accurately inspected.

Figure 5:
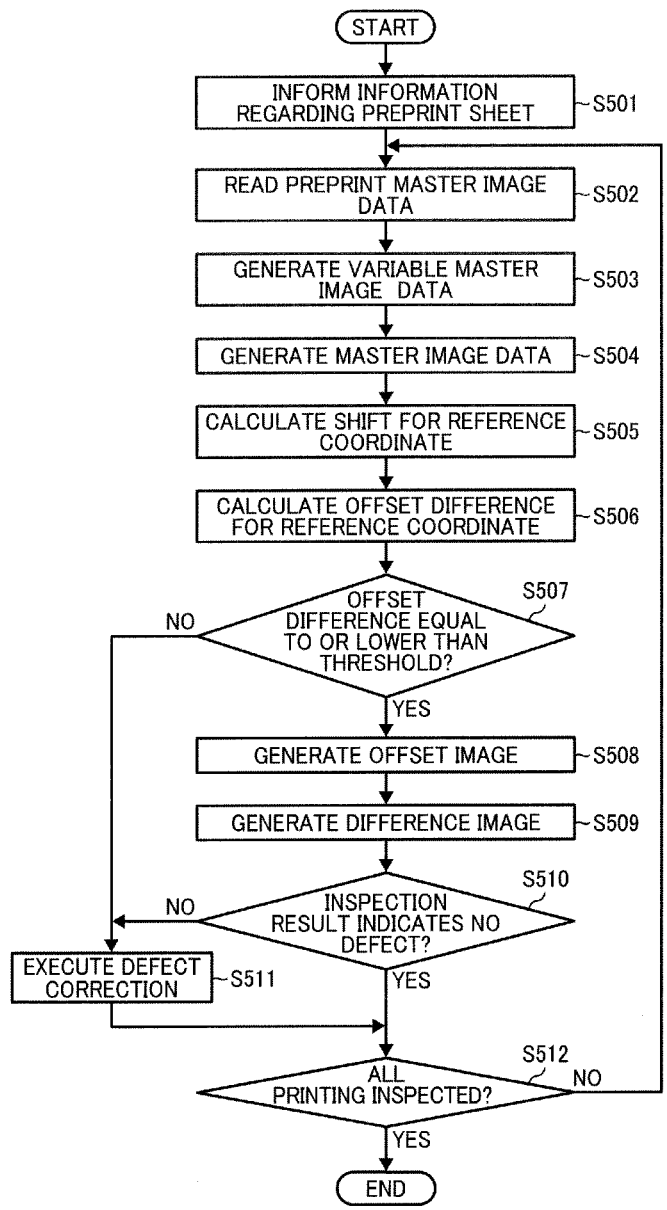
FIG. 5 is a flowchart illustrating operation of inspecting the print quality of a print result printed by a printer, performed by the inspection apparatus of FIG. 1, according to an example embodiment of the present invention.

Now, referring to FIG. 5, example operation of inspecting the print quality of printed matter, performed by the inspection apparatus 140, will be described. FIG. 5 is a flowchart illustrating operation of inspecting the print quality of a print result R printed by the printer 110, performed by the inspection apparatus 140. When the printer 110 performs printing on a preprint sheet P, the printer 110 receives a print job from an external source and informs the inspection apparatus 140 of information regarding a preprint sheet P used for printing from the received print job (S501).

The inspection apparatus 140 transmits preprint master image data corresponding to the informed information from the HDD 147 to the comparator 146 through the buffer 144. The comparator 146 stores the transmitted preprint master image data in a memory such as the buffer 144 for a preprint master image PM (S502).

Figure 6:
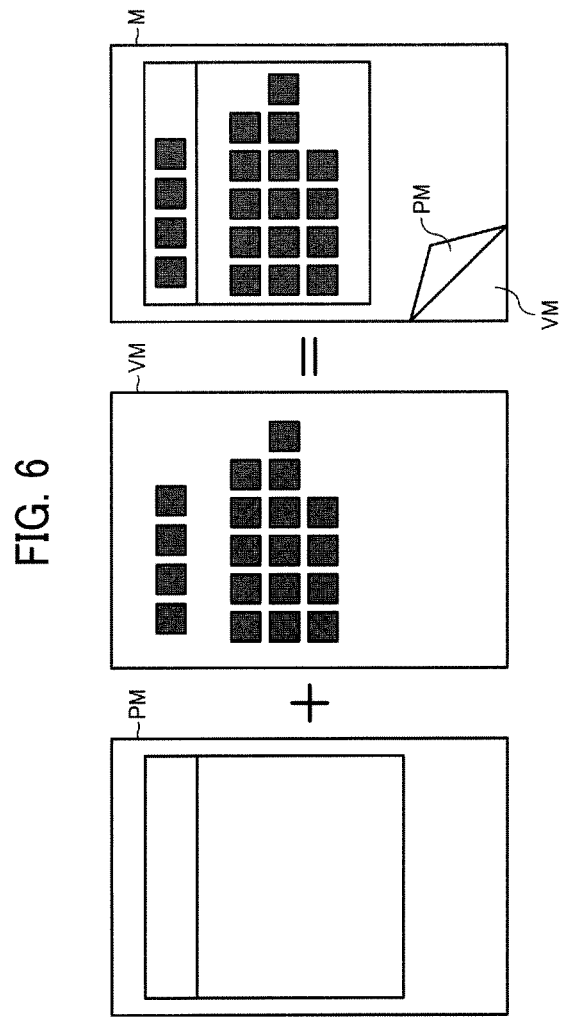
FIG. 6 is an illustration for explaining a state in which a variable master image and a preprint master image are superimposed on each other such that all edges match, i.e., a state in which the offset difference is 0.

The printing apparatus operates in the normal print mode to perform printing. The master image generator 143 generates variable master image data, based on a RIP image transferred to the inspection apparatus 140. The master image generator 143 stores the variable master image data in the buffer 144 and transfers the variable master image data to the comparator 146 (S503). Namely, in the processes at S502 and S503, the comparator 146 functions as an image obtaining unit. The comparator 146 superimposes, as illustrated in FIG. 6 which will be described later, a transferred variable master image VM on a stored preprint master image PM such that all the edges thereof match, and sets this state as an offset difference OD of 0. The comparator 146 further sets a movable area where the printed portions of the images do not overlap each other, as a threshold Th of an offset difference OD. Namely, the comparator 146 functions as an overlap shift obtaining unit, which will be described in detail later.

Then, the comparator 146 stores, as master image data, the superimposed images together with the set threshold Th of the offset difference OD in a memory such as the buffer 144 (S504). As used herein, the offset difference OD refers to a relative shift of one of the preprint image and the variable image V with respect to the other image serving as a reference image.

The methods of setting a threshold Th include, for example, a method in which the user sets a threshold Th to a value based on the desired degree of accuracy and a method in which a threshold Th is automatically set. The former method is useful for when the change in magnification or the change in print position of the printed portions of the respective images requires accuracy, because the threshold Th can be set according to the degree of accuracy.

On the other hand, the latter method is useful for when the change in magnification or the change in print position of the printed portions of the respective images does not require so much accuracy such that some changes are allowed. In such case, this method of automatically setting reduces the workload for the user. In the latter method, i.e., the method in which the threshold Th is automatically set, first, one of the preprint master image PM and the variable master image VM is allowed to move in any direction to make the transition from a state in which the offset difference OD is 0 to a state in which the printed portions of the images are made in contact with each other such that they start to be overlapped. The amount of movement of the moved master image is set as the above-described threshold Th. As specific examples thereof, there are, for example, two types of methods. The two types of methods will be described below with reference to FIGS. 6, 7, and 8. Note that in FIGS. 6 to 9 and 11 to 14 to be referred to in the following description, for simplification of description, the printed portions of a variable image V are represented by blackened squares.

FIG. 6 is illustrates a state in which a variable master image VM and a preprint master image PM are superimposed on each other such that all the edges thereof match, i.e., a state in which the offset difference OD is 0. In this example, it is assumed that the preprint master image PM and the variable master image VM are generated to be of the same resolution and the same size. Therefore, the state illustrated in FIG. 6 is a state in which the preprint master image PM and the variable master image VM are superimposed on each other according to the size thereof. As described above, in threshold setting by automatic setting, one of the preprint master image PM and the variable master image VM is allowed to move in any direction from this state to make the transition to a state in which the printed portions of the images are made in contact with each other.

Figure 7:
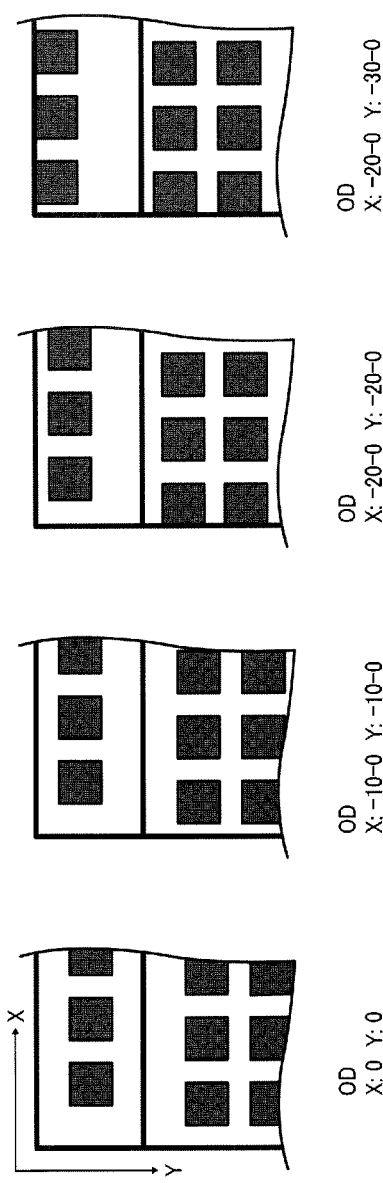
FIG. 7 is an illustration for explaining example operation of setting a threshold of an offset difference.

The first method is a method in which, as illustrated in FIG. 7, either master image is allowed to move up, down, right, and left pixel by pixel, and when the printed portions of the images overlap each other for the first time from a state in which the offset difference OD is 0, a threshold Th is set from the amount of the movement made at that time. FIG. 7 illustrates an example in which a preprint master image PM is used as a reference image and a variable master image VM is allowed to move to the left and is, at the same time, allowed to move up. It can be seen that in the example illustrated in FIG. 7 the threshold Th of the offset difference OD has a lower limit value ThL of −20 in X direction and a lower limit value ThL of −30 in Y direction. Likewise, by allowing the variable master image VM to move to the right and allows, at the same time, the variable master image VM to move down, the upper limit values ThU in X and Y directions can be determined. Note that the same results as those described above are obtained even by using the variable master image VM as a reference image and allowing the preprint master image PM to move in the same manner.

Figure 8:
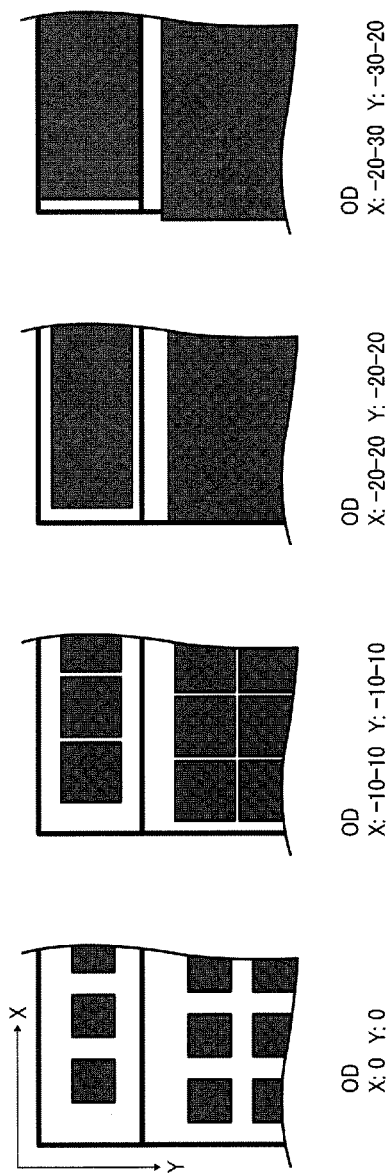
FIG. 8 is an illustration for explaining example operation of setting a threshold of an offset difference.

The second method is a method in which, as illustrated in FIG. 8, the printed portions of both master images are converted to two values, black and white, and the printed portions with blackened pixels of either master image are expanded pixel by pixel, and a threshold Th is determined for each of up, down, right, and left from the amount of expansion obtained when each printed portion overlaps for the first time. FIG. 8 illustrates an example in which a preprint master image PM is used as a reference image and a variable master image VM is expanded. It can be seen that in the example illustrated in FIG. 8 the threshold Th of the offset difference OD has lower and upper limit values ThL and ThU of −20 and +30 in X direction, respectively, and lower and upper limit values ThL and ThU of −30 and +20 in Y direction, respectively. Note that the same results as those described above are obtained even by using the variable master image VM as a reference image and expanding the preprint master image PM in the same manner.

For detection of overlap between a preprint image and a variable image V, there is, for example, a method in which a pixel having a pixel value darker than a certain threshold is defined as a composition pixel that composes graphics in the preprint image and the variable image V, and when a composition pixel in the preprint image overlaps a composition pixel in the variable image V, it is determined that overlap is detected.

Figure 9:
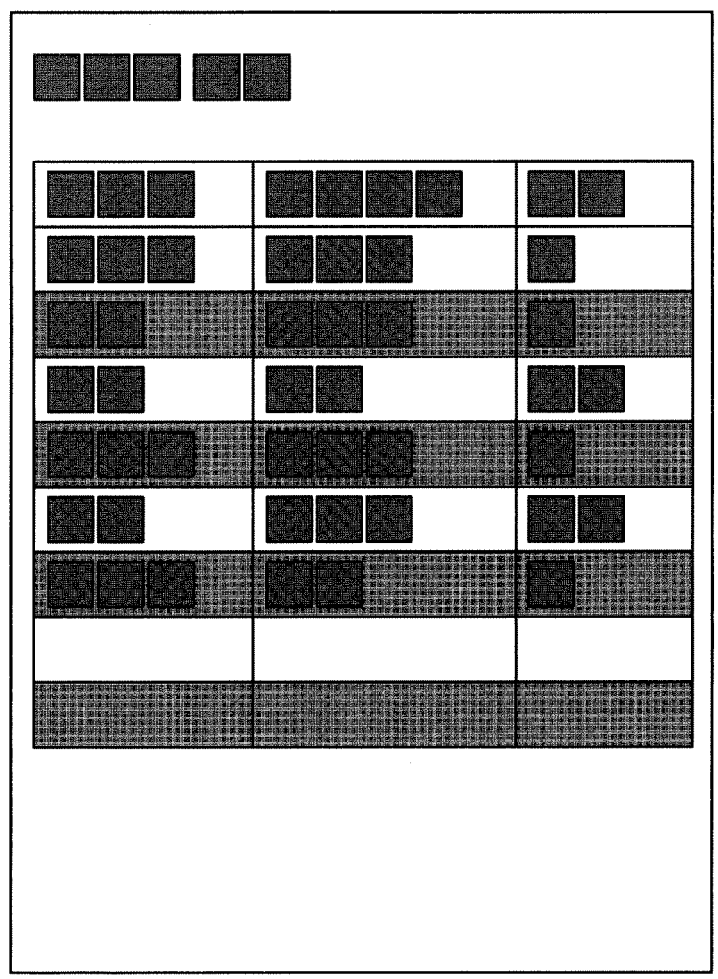
FIG. 9 is an illustration of an example preprint sheet to be printed by the printing apparatus of FIG. 1, according to an example embodiment of the present invention.

Alternatively, as illustrated in FIG. 9, in a preprint master image PM, it is also considered that cells are represented by alternately arranging a colored region and a non-colored region instead of separating cells by lines. In this case, despite the fact that the printed portions of a preprint master image PM and the printed portions of a variable master image VM are in a state in which the offset difference OD is 0, they already overlap each other. Thus, when setting a threshold Th of an offset difference OD, overlap cannot be accurately detected.

Figure 11:
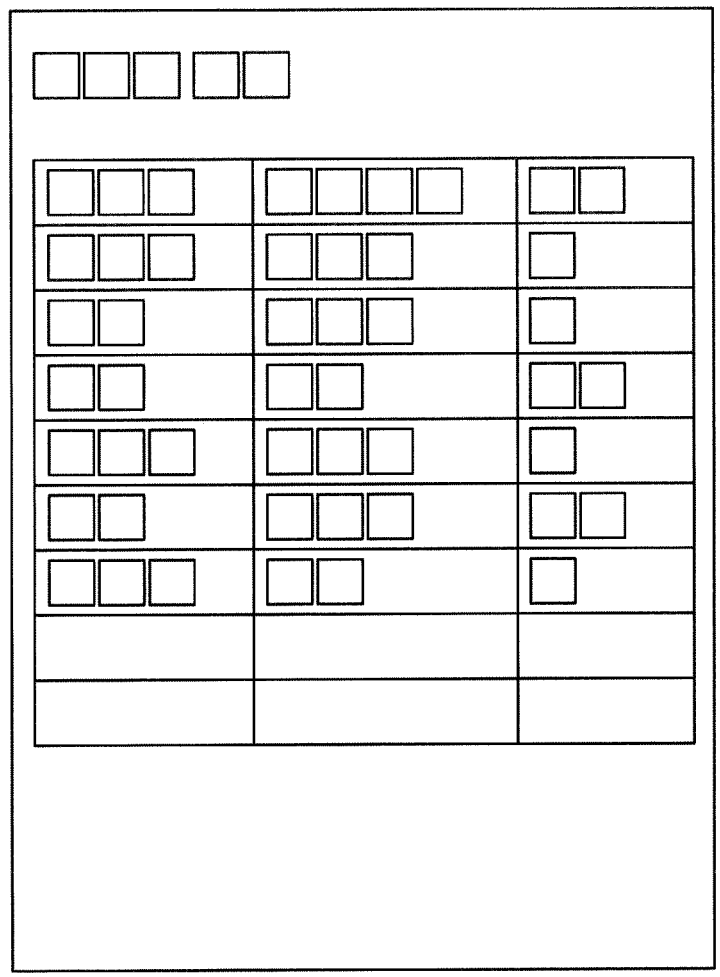
FIG. 11 is an illustration for explaining a state after performing filtering for extraction of outlines on the preprint sheet illustrated in FIG. 9.

Therefore, in such a case, first, filtering for extraction of outlines such as those illustrated in FIGS. 10A to 10C is performed on a master image M illustrated in FIG. 9. FIGS. 10A, 10B, and 10C are diagrams illustrating a Laplacian filter, a differential filter in X direction, and a differential filter in Y direction, respectively. By this, as illustrated in FIG. 11, outlines can be appropriately extracted. Then, by the same operation as that described above, a threshold Th of an offset difference OD can be set for a master image M obtained after the extraction of outlines, illustrated in FIG. 11.

Referring back to FIG. 5, when generation of master image data (S504) is completed, the comparator 146 individually calculates, for a preprint image layer and a variable image layer, a shift between the positional coordinates of a reference point in the master image M and corresponding positional coordinates in the inspection image (S505). Namely, here, the comparator 146 functions as a positional shift obtaining unit. Then, the comparator 146 calculates an offset difference OD from the calculated shifts (S506), and determines whether the offset difference OD is equal to or lower than the threshold Th set at S504, and thereby makes an overlap determination (S507). Namely, the comparator 146 functions as an overlap detector. Here, FIGS. 12 and 13 are diagrams schematically illustrating the processes at S505 to S507.

Figure 12:
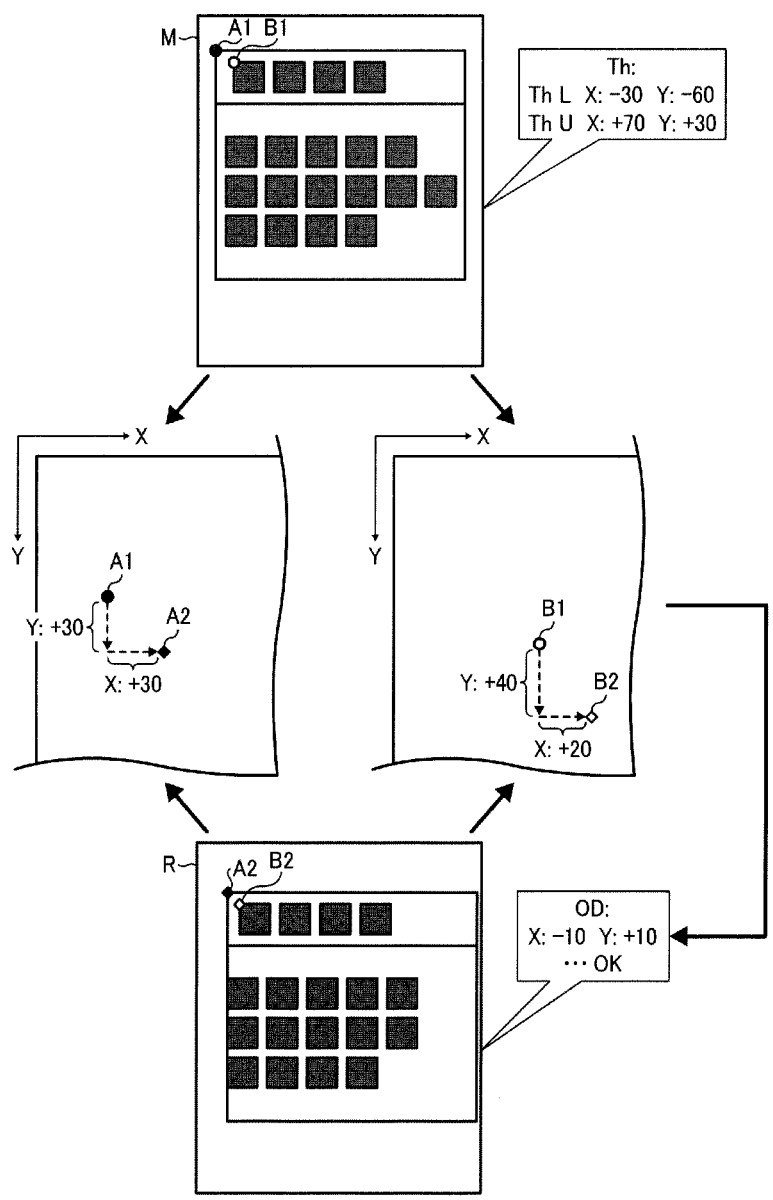
FIG. 12 is an illustration for explaining offset difference calculation and overlap determination processes according to an example embodiment of the present invention.

In FIG. 12, A1 indicates a reference point of a preprint layer of the master image M, and A2 indicates a reference point of a preprint layer of the read image R. B1 indicates a reference point of a variable layer of the master image M, and B2 indicates a reference point of a variable layer of the read image R. The threshold Th of the offset difference OD has a lower limit value ThL of −30 in X direction and −60 in Y direction, and an upper limit value ThU of +70 in X direction and +30 in Y direction. In FIG. 12, it can be seen that for the shifts for the positional coordinates of a reference point calculated in the process at S505, the preprint image layer has a shift of X: +30 and Y: +30 and the variable image layer has a shift of X: +20 and Y: +40, and the offset difference OD calculated in the process at S506 is X: −10 and Y: +10. In addition, it can be seen that in the example illustrated in FIG. 12, since the offset difference OD is X: −10 and Y: +10, it is determined in the overlap determination at S507 that the printed portions of the preprint image and the printed portions of the variable image V in the inspection image do not overlap each other.

Figure 13:
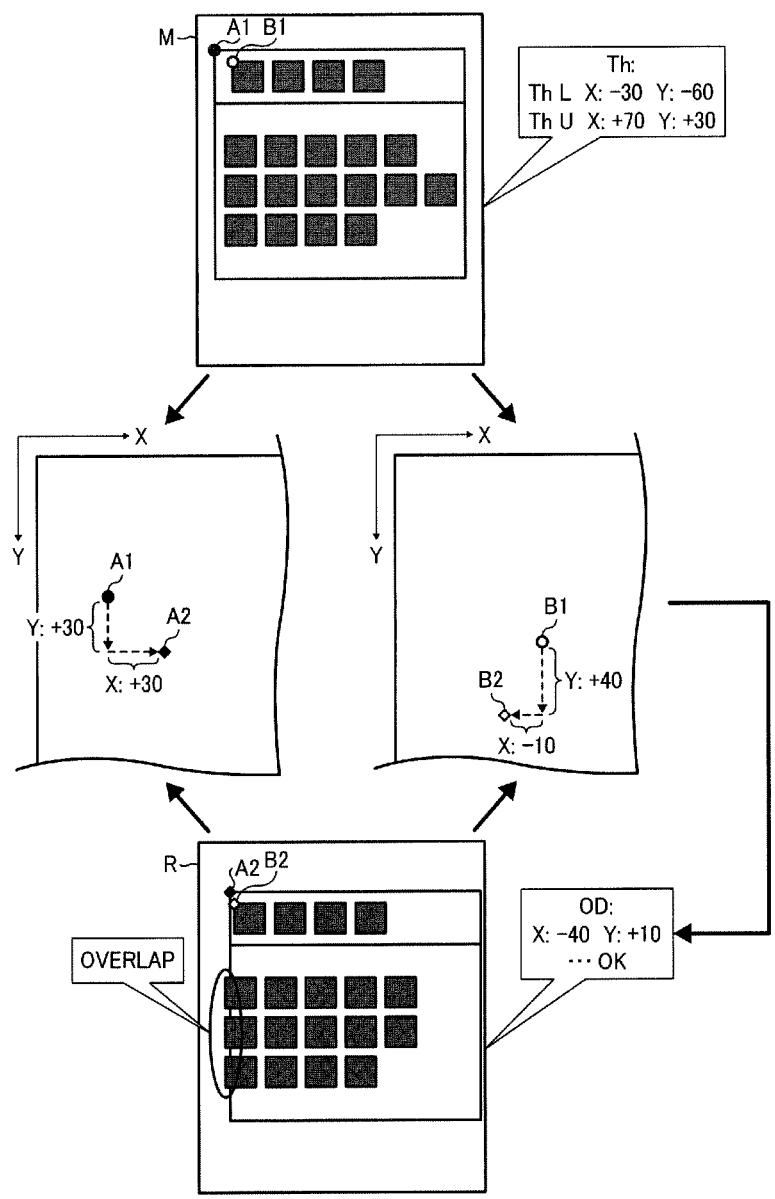
FIG. 13 is an illustration for explaining offset difference calculation and overlap determination processes according to an example embodiment of the present invention.

In FIG. 13, A1 indicates a reference point of a preprint layer of the master image M, and A2 indicates a reference point of a preprint layer of the read image R. B1 indicates a reference point of a variable layer of the master image M, and B2 indicates a reference point of a variable layer of the read image R. The threshold Th of the offset difference OD has a lower limit value ThL of −30 in X direction and −60 in Y direction, and an upper limit value ThU of +70 in X direction and +30 in Y direction. In FIG. 13, it can be seen that for the shifts for the positional coordinates of a reference point calculated in the process at S505, the preprint image layer has a shift of X: +30 and Y: +30 and the variable image layer has a shift of X: −10 and Y: +40, and the offset difference OD calculated in the process at S506 is X: −40 and Y: +10. In addition, it can be seen that in the example illustrated in FIG. 13, since the offset difference OD is X: −40 and Y: +10, it is determined in the overlap determination at S507 that the printed portions of the preprint image and the printed portions of the variable image V in the inspection image overlap each other.

If, as a result of the overlap determination, the comparator 146 determines that the offset difference OD is equal to or lower than the threshold Th ("YES" at S507), then a defect determination is made (S508 to S510). On the other hand, if the offset difference OD exceeds the threshold Th ("NO" at S507), then the printing apparatus executes a predetermined defect correction such as reprinting, cancellation of printing, or display of an alert on the operating unit 120 (S511). In this example, the defect determination is an inspection performed separately from an overlap determination, and is an inspection for finding defects, e.g., spots or printing errors. Namely, the comparator 146 functions as an image inspection unit.

To make a defect determination, first, the comparator 146 superimposes the preprint master image PM and the variable master image VM on top of each other with the images aligned based on the shifts for the positional coordinates of a reference point calculated in the process at S505, and thereby generates an offset image O (S508). The offset image O is an image obtained by combining the preprint master image PM and the variable master image VM which are aligned according to the positional shifts of the variable image V and the preprint image in the read image R. Then, the comparator 146 takes differences in corresponding pixel values between the offset image O generated at S508 and the inspection image (read image R) and thereby generates a difference image D (S509). Then, the comparator 146 makes a defect determination based on the difference image D generated at S509 (S510).

Figure 14:
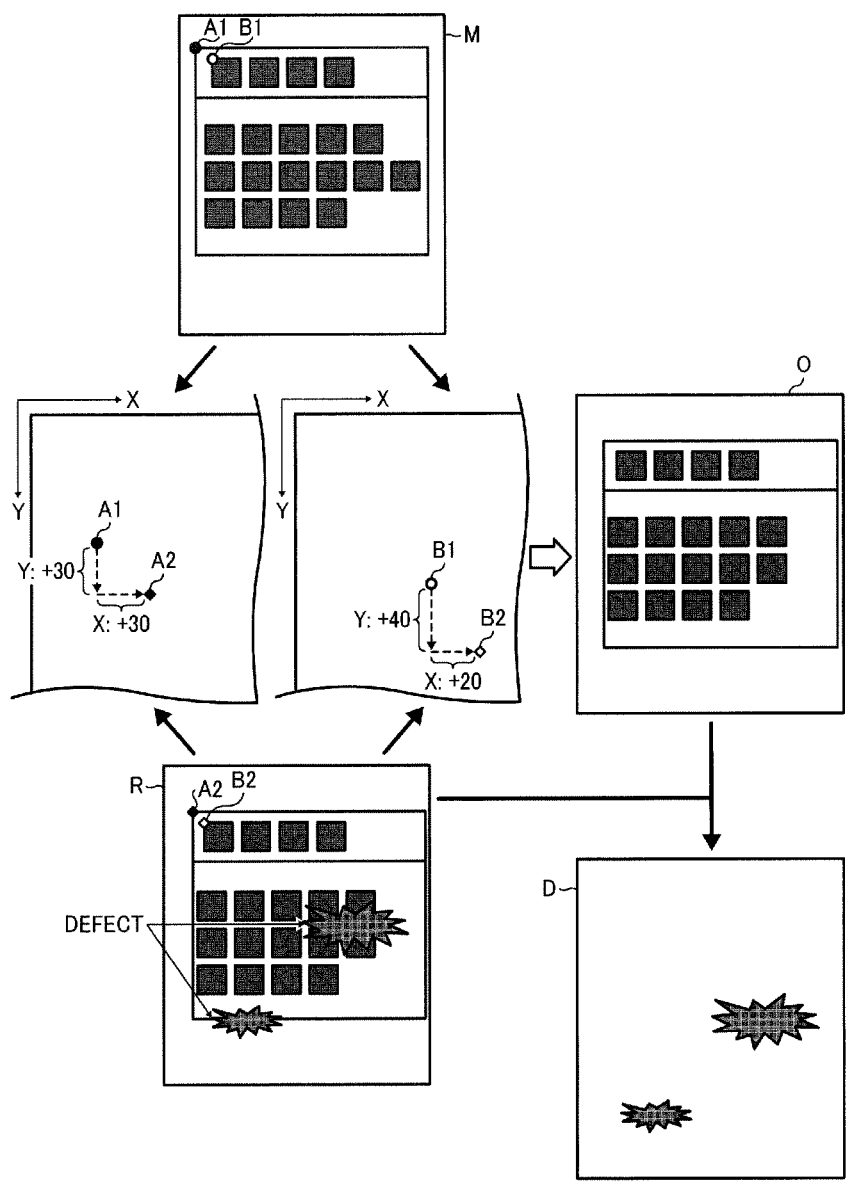
FIG. 14 is an illustration for explaining a defect determination process according to an example embodiment of the present invention.

In FIG. 14, A1 indicates a reference point of a preprint layer of he master image M, and A2 indicates a reference point of a preprint layer of the read image R. B1 indicates a reference point of a variable layer of the master image M, and B2 indicates a reference point of a variable layer of the read image R. FIG. 14 is a diagram schematically illustrating the processes at S508 and S509. In FIG. 14, it can be seen that for the shifts for the positional coordinates of a reference point calculated in the process at S505, the preprint image layer has a shift of X: +30 and Y: +30 and the variable image layer has a shift of X: +20 and Y: +40. Then, it can be seen that the preprint master image PM and the variable master image VM are superimposed on each other based on the shifts, thereby generating an offset image O, and by taking differences between the inspection image and the offset image O, a difference image D is generated.

In the defect determination, if the comparator 146 determines that there are no defects ("YES" at S510), it is determined that printing has been performed normally, and thus, the printed sheet is transported to the stacker 150. If it is determined in the defect determination that there is a defect ("NO" at S510), then the printing apparatus executes a predetermined defect correction such as reprinting, cancellation of printing, or display of an alert on the operating unit 120 (S511).

The printing apparatus repeatedly performs the processes at S502 to S511 until all printing to be inspected is completed ("NO" at S512). If all printing to be inspected has been completed ("YES" at S512), the inspection process ends. Note that if printing to be inspected is the same as the last one, i.e., both the preprint master image PM and the variable master image VM correspond to the last document ("NO" at S512), S502, S503, and S504 can be omitted. Note also that in the above description, defect determination is made after making overlap determination and determining as a result of the determination that there is no overlap; however, overlap determination may be made after making defect determination and determining as a result of the determination that there are no defects.

The above description is made assuming that in a state in which a preprint master image PM and a variable master image VM are superimposed on each other such that all the edges thereof match, i.e., a state in which the offset difference OD is 0, the printed portions of the images do not overlap each other. However, the case is also considered in which printing needs to be performed such that the printed portions of the images overlap each other. In this case, despite the fact that the printed portions of the preprint master image PM and the printed portions of the variable master image VM are in a state in which the offset difference OD is 0, they already overlap each other, and thus, setting of a threshold Th of an offset difference OD or an overlap determination cannot be performed. Hence, in such a case, the configuration may be such that the coordinates of an overlapping position is specified in advance in the inspection apparatus 140 by user operation, and in threshold setting or an overlap determination the specified coordinates are excluded from the coordinates subjected for overlap determination.

As described above, in the printing apparatus according to the above-described example, by previously setting a threshold Th of an offset difference OD upon generating master image data, overlap between the printed portions of a preprint image and the printed portions of a variable image V in an inspection image can be detected, enabling to accurately inspect the print quality of a print result R.

When overlap is detected, a defect determination can be made before calculating differences between an offset image O and a read image R. Therefore, the workload of a difference calculation process with a heavy workload is reduced, enabling to reduce the time required for an inspection. Thus, according to the above-described example, when print quality is inspected by comparing an image of printed matter printed by preprint printing with a master image M, an accurate inspection result can be obtained with a simple configuration.

More specifically, in one example, an image inspection method is provided, which inspects a read image generated by reading a document by a reading device. The document may be formed on a sheet having a predetermined image provided thereon in advance, by an image forming apparatus. The method includes: obtaining an output target image on which image formation output is performed by the image forming apparatus, and a pre-provided image being the predetermined image provided on the sheet in advance; based on the obtained output target image and pre-provided image, determining an overlap shift being a shift occurring when a printed portion of the output target image and a printed portion of the pre-provided image overlap each other in a case where the output target image and the pre-provided image are shifted from a superimposing reference position; determining an output target image positional shift based on the read image and the obtained output target image, the output target image positional shift being a positional shift between the output target image in the read image and the obtained output target image; determining a pre-provided image positional shift based on the read image and the obtained pre-provided image, the pre-provided image positional shift being a positional shift between the pre-provided image in the read image and the obtained pre-provided image; detecting overlap between the output target image and the pre-provided image in the read image by comparing a relative value of the output target image positional shift to the pre-provided image positional shift with the overlap shift; and inspecting the image based on a result of the overlap detection.

For example, the output target image may correspond to an image to be formed on the recording sheet, such as the variable image formed on the recording sheet. The pre-provided image may correspond to an image that is previously provided on the recording sheet before the output target image is printed, such as the pre-print image.

In one example, the overlap shift is a shift from the reference position occurring when pixels of a predetermined density or higher in the output target image and the pre-provided image overlap each other for a first time by shifting the output target image and the pre-provided image up, down, right, and left on a pixel-by-pixel basis from a state in which the output target image and the pre-provided image are superimposed on each other in the reference position.

In another example, the overlap shift is an amount of expansion obtained when pixels of a predetermined density or higher in the output target image and the pre-provided image overlap each other for a first time by expanding a pixel of the predetermined density or higher in one of the output target image and the pre-provided image on a pixel-by-pixel basis in a state in which the output target image and the pre-provided image are superimposed on each other in the reference position.

In another example, the overlap shift is an amount of expansion obtained when pixels of a predetermined density or higher in the output target image and the pre-provided image overlap each other for a first time for each of up, down, right, and left by expanding a pixel of the predetermined density or higher in one of the output target image and the pre-provided image on a pixel-by-pixel basis in a state in which the output target image and the pre-provided image are superimposed on each other in the reference position.

In another example, only when overlap between the output target image and the pre-provided image in the read image has not been detected, comparison inspection between an inspection image and the read image is performed, the inspection image being generated based on the obtained output target image and pre-provided image.

Another aspect of the present invention is directed to an image inspection apparatus that inspects a read image generated by reading, by a reading apparatus, a document generated by performing an image formation output by an image forming apparatus on a sheet having a predetermined image provided thereon in advance, the image inspection apparatus including: an image obtaining unit that obtains an output target image on which an image formation output is performed by the image forming apparatus, and a pre-provided image being the predetermined image provided on the sheet in advance; an overlap shift obtaining unit that determines, based on the obtained output target image and pre-provided image, an overlap shift being a shift occurring when a printed portion of the output target image and a printed portion of the pre-provided image overlap each other in a case where the output target image and the pre-provided image are shifted from a superimposing reference position; a positional shift obtaining unit that determines an output target image positional shift based on the read image and the obtained output target image, and determines a pre-provided image positional shift based on the read image and the obtained pre-provided image, the output target image positional shift being a positional shift between the output target image in the read image and the obtained output target image, and the pre-provided image positional shift being a positional shift between the pre-provided image in the read image and the obtained pre-provided image; an overlap detector that detects overlap between the output target image and the pre-provided image in the read image by comparing a relative value of the output target image positional shift to the pre-provided image positional shift with the overlap shift; and an image inspection unit that inspects the image based on a result of the overlap detection.

A still another aspect of the present invention is directed to a control program for an image inspection apparatus that inspects a read image generated by reading, by a reading apparatus, a document generated by performing an image formation output by an image forming apparatus on a sheet having a predetermined image provided thereon in advance, the control program causing the image inspection apparatus to perform the steps of: obtaining an output target image on which an image formation output is performed by the image forming apparatus, and a pre-provided image being the predetermined image provided on the sheet in advance; based on the obtained output target image and pre-provided image, determining an overlap shift being a shift occurring when a printed portion of the output target image and a printed portion of the pre-provided image overlap each other in a case where the output target image and the pre-provided image are shifted from a superimposing reference position; determining an output target image positional shift based on the read image and the obtained output target image, the output target image positional shift being a positional shift between the output target image in the read image and the obtained output target image; determining a pre-provided image positional shift based on the read image and the obtained pre-provided image, the pre-provided image positional shift being a positional shift between the pre-provided image in the read image and the obtained pre-provided image; detecting overlap between the output target image and the pre-provided image in the read image by comparing a relative value of the output target image positional shift to the pre-provided image positional shift with the overlap shift; and inspecting the image based on a result of the overlap detection.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

For example, the printing apparatus of FIG. 1 may be implemented as a printing system, which includes a plurality of apparatuses that communicate with one another to perform the above-described functions. In such case, the operating unit 120 may be provided remotely from the printer 110, the inspection apparatus 140, and the stacker 150. In one example, the operation unit 120 may be implemented by an information processing apparatus such as a personal computer.

Further, the reading device 141 or 142 does not have to be provided in the inspection apparatus 140, as long as the inspection apparatus 140 obtains the read image of the printed image formed on the recording sheet for inspection. For example, the printer 110 may be provided with the reading device, which may be disposed downstream the fixing roller 114.

What is claimed is:

1. An image inspection method, comprising:
obtaining a read image, the read image including a pre-provided image previously provided on a recording sheet and an output target image formed on the recording sheet having the pre-provided image;
obtaining a pre-provided inspection image;
obtaining an output target inspection image based on the output target image of the read image;
obtaining a threshold value indicating an allowable range of offset differences between the output target inspection image and the pre-provided inspection image, with respect to the minimum offset difference obtained at a reference position at which the output target inspection image and the pre-provided inspection image are superimposed;
obtaining an output target image positional shift indicating a positional shift between the output target image in the read image and the output target inspection image;
obtaining a pre-provided image positional shift indicating a positional shift between the pre-provided image in the read image and the pre-provided inspection image;
comparing a relative value of the output target image positional shift with respect to the pre-provided image positional shift, with the threshold value, to generate a determination result indicating whether the output target image and the pre-provided image in the read image overlap; and
inspecting the read image using the output target inspection image and the pre-provided inspection image based on the determination result.

2. The image inspection method of claim 1, wherein the obtaining a threshold value includes:
causing the output target inspection image and the pre-provided inspection image be superimposed;
moving one of the output target inspection image or the pre-provided inspection image in a direction of up, down, right, or left, with respect to the other one of the output target inspection image or the pre-provided inspection image, from the reference position;
obtaining an offset difference between the output target inspection image and the pre-provided inspection image when a printed portion of the output target inspection image and a printed portion of the pre-provided inspection image start to overlap each other; and
obtaining the allowable range of offset differences based on the obtained offset difference and the minimum offset difference.

3. The image inspection method of claim 2, wherein the obtaining a threshold value includes:
determining that the printed portion of the output target inspection image and the printed portion of the pre-provided inspection image start to overlap each other, when a pixel having a density value equal to or higher than a predetermined value in the output target inspection image overlaps with a corresponding pixel in the pre-provided inspection image.

4. The image inspection method of claim 1, wherein the obtaining a threshold value includes:
causing the output target inspection image and the pre-provided inspection image be superimposed;
expanding a pixel of one of the output target inspection image or the pre-provided inspection image in a direction of up, down, right, or left, with respect to a corresponding pixel of the other one of the output target inspection image and the pre-provided inspection image;
obtaining an amount of expansion of the expanded pixel when the expanded pixel of one of the output target inspection image or the pre-provided inspection image overlaps with the corresponding pixel of the other one of the output target inspection image or the pre-provided inspection image for the first time; and
obtaining the allowable range of offset differences based on the obtained amount of expansion.

5. The image inspection method of claim 4, wherein the pixel being expanded has a density equal to or higher than a predetermined value.

6. The image inspection method of claim 4, wherein the amount of expansion is obtained for each one of the directions of up, down, right, and left.

7. The image inspection method of claim 1, wherein only when the determination result indicates that the output target image and the pre-provided image in the read image overlap, the step of inspecting the read image is performed.

8. An image inspection apparatus, comprising:
an image reading device configured to read a printed image formed on a recording sheet to obtain a read image, the read image including a pre-provided image previously provided on the recording sheet and an output target image formed on the recording sheet having the pre-provided image;
a comparator configured to:
obtain a pre-provided inspection image;
obtain an output target inspection image based on the output target image of the read image;
obtain a threshold value indicating an allowable range of offset differences between the output target inspection image and the pre-provided inspection image, with respect to the minimum offset difference obtained at a reference position at which the output target inspection image and the pre-provided inspection image are superimposed;
obtain an output target image positional shift indicating a positional shift between the output target image in the read image and the output target inspection image;
obtain a pre-provided image positional shift indicating a positional shift between the pre-provided image in the read image and the pre-provided inspection image;
compare a relative value of the output target image positional shift with respect to the pre-provided image positional shift, with the threshold value, to generate a determination result indicating whether the output target image and the pre-provided image in the read image overlap; and
inspect the read image using the output target inspection image and the pre-provided inspection image based on the determination result.

9. The image inspection apparatus of claim 8, wherein the comparator is configured to,
cause the output target inspection image and the pre-provided inspection image be superimposed;
move one of the output target inspection image or the pre-provided inspection image in a direction of up, down, right, or left, with respect to the other one of the output target inspection image or the pre-provided inspection image, from the reference position;
obtain an offset difference between the output target inspection image and the pre-provided inspection image when a printed portion of the output target inspection image and a printed portion of the pre-provided inspection image start to overlap each other; and
obtain the allowable range of offset differences based on the obtained offset difference and the minimum offset difference.

10. The image inspection apparatus of claim 9, wherein the comparator is configured to,
determine that the printed portion of the output target inspection image and the printed portion of the pre-provided inspection image start to overlap each other, when a pixel having a density value equal to or higher than a predetermined value in the output target inspection image overlaps with a corresponding pixel in the pre-provided inspection image.

11. The image inspection apparatus of claim 8, wherein the comparator is configured to,
cause the output target inspection image and the pre-provided inspection image be superimposed;
expand a pixel of one of the output target inspection image or the pre-provided inspection image in a direction of up, down, right, or left, with respect to a corresponding pixel of the other one of the output target inspection image and the pre-provided inspection image;
obtain an amount of expansion of the expanded pixel when the expanded pixel of one of the output target inspection image or the pre-provided inspection image overlaps with the corresponding pixel of the other one of the output target inspection image or the pre-provided inspection image for the first time; and
obtain the allowable range of offset differences based on the obtained amount of expansion.

12. The image inspection apparatus of claim 11, wherein the pixel being expanded has a density equal to or higher than a predetermined value.

13. The image inspection apparatus of claim 11, wherein the amount of expansion is obtained for each one of the directions of up, down, right, and left.

14. The image inspection apparatus of claim 8, wherein only when the determination result indicates that the output target image and the pre-provided image in the read image overlap, the step of inspecting the read image is performed.

15. An image forming system, comprising:
an image forming apparatus configured to form the output target image on the recording sheet having the pre-provided image, and output the recording sheet with the printed image; and
the image inspection apparatus of claim 8.

16. A non-transitory recording medium storing a plurality of instructions which, when executed by a processor, cause the processor to perform an image inspection method, the method comprising:
obtaining a read image, the read image including a pre-provided image previously provided on a recording sheet and an output target image formed on the recording sheet having the pre-provided image;
obtaining a pre-provided inspection image;
obtaining an output target inspection image based on the output target image of the read image;

obtaining a threshold value indicating an allowable range of offset differences between the output target inspection image and the pre-provided inspection image, with respect to the minimum offset difference obtained at a reference position at which the output target inspection image and the pre-provided inspection image are superimposed;

obtaining an output target image positional shift indicating a positional shift between the output target image in the read image and the output target inspection image;

obtaining a pre-provided image positional shift indicating a positional shift between the pre-provided image in the read image and the pre-provided inspection image;

comparing a relative value of the output target image positional shift with respect to the pre-provided image positional shift, with the threshold value, to generate a determination result indicating whether the output target image and the pre-provided image in the read image overlap; and inspecting the read image using the output target inspection image and the pre-provided inspection image based on the determination result.

* * * * *